United States Patent [19]

Sakurai et al.

[11] Patent Number: 5,238,625
[45] Date of Patent: Aug. 24, 1993

[54] PROCESS FOR PREPARING ZIRCONIA SOLS AND/OR ZIRCONIA FORMS

[75] Inventors: Chihiro Sakurai; Masahiko Okuyama, both of Kitakyushu, Japan

[73] Assignee: Colloid Research Institute, Fukuoka, Japan

[21] Appl. No.: 740,774

[22] Filed: Aug. 6, 1991

[30] Foreign Application Priority Data

Apr. 12, 1991 [JP] Japan .................................. 3-080092

[51] Int. Cl.$^5$ .............................................. C04B 35/48
[52] U.S. Cl. ...................... 264/56; 252/309; 501/12; 501/103; 501/104
[58] Field of Search ..................... 264/56; 501/12, 103, 501/104; 252/309

[56] References Cited

U.S. PATENT DOCUMENTS 4,429,051 1/1984 Davidge ................................. 501/12
5,047,174 9/1991 Sherif ..................................... 501/12

FOREIGN PATENT DOCUMENTS 2-293324(A) 4/1990 Japan .

OTHER PUBLICATIONS

Japanese Article, "ZrO$_2$ Fibers Prepared by Sol-Gel Method", by Tosinobu Yoko and Kanichi Kamiya, published in *Fine Ceramics*, 1988.

Japanese Article, "Parameters that Affect the Hydrolysis of Zirconium Alkoxide and Preparation of Monolithic Gels", by Hajime Saito, Hisao Suzuki and Hiroaki Hayashi, published in *The Chemical Society of Japan*, pp. 1571-1577, dated 1988.

*Primary Examiner*—James Derrington
*Attorney, Agent, or Firm*—Armstrong, Westerman, Hattori, McLeland & Naughton

[57] ABSTRACT

Zirconia sols are prepared by hydrolyzing zirconium alkoxides by aqueous hydrogen peroxide in the presence of an acid, evaporating the hydrolysates to dryness, and redispersing the dried hydrolysates in an organic solvent and the sols can be used for the preparation of zirconia forms in a desired shape satisfactorily on a commercial scale with removal of as much residual carbon as possible and without foaming in the gelation and molding steps.

8 Claims, No Drawings

PROCESS FOR PREPARING ZIRCONIA SOLS AND/OR ZIRCONIA FORMS

FIELD OF THE INVENTION AND RELATED ART STATEMENT

This invention relates to a process for preparing zirconia sols which serve as raw materials in the manufacture of zirconia potentially useful for structural ceramics such as thermal insulators and refractories and functional ceramics such as solid electrolytes, sensors, and catalysts or a process for preparing zirconia forms from said zirconia sols.

In recent years, extensive studies are under way on the so-called sol-gel process for the preparation of high-quality ceramics; a sol formed by the hydrolysis of a metal alkoxide is gelled, dried, and sintered at a specified temperature to yield a ceramic material. In comparison with a conventional process of sintering a mixture of metal oxide powders, the aforesaid sol-gel process has a number of advantages such as the following: ① it yields products of better purity, ② it yields products of higher homogenity, ③ it yields products sintered at lower temperature, and ④ it has a higher degree of freedom in shaping the objects. As a consequence, this process is expected to play a key role in the development of highly functional ceramics.

Several proposals have been made on the preparation of zirconia by the sol-gel process and ceramic products have been obtained in the form of powders, fibers, bulks, or films. According to this process, a zirconium alkoxide is dissolved in an organic solvent such as benzene, ethanol, and isopropanol, the solution is hydrolyzed to a sol, and the sol is converted to a gel of various shapes while strict control, for instance, the control of the amount of water, pH, temperature, aging time and so on, is required to hydrolyze and polycondense. The gel thus prepared is sintered to yield zirconia in the desired shape.

Saito and coworkers controlled the amount of water used and the pH for the hydrolysis and the temperature and the time for the aging of gel and obtained zirconia in bulks at pH=2 and in powders at pH=10 [Journal of the Chemical Society of Japan (in Japanese), No. 9, pp. 1571-1577 (1988)].

Yokoo and coworkers added an acid to a solution of $Zr(O-nC_3H_7)_4$, aged the mixture at 80° C., spun the resulting viscous solution into gel fibers, and sintered the gel fibers to furnish zirconia ceramic fibers [Fine Ceramics (in Japanese), Vol. 9, pp. 163-175 (1988)].

Complexity arises in the above-mentioned processes, however, as most of the operations must be conducted out of contact with moisture in the air, for example, the operations must be conducted in a glove box, or the water for the hydrolysis must be added slowly to avoid the formation of white precipitates. Besides, strict control is required, such as the control of the amount of water, pH, hydrolysis temperature and aging time. Hence, the processes are difficult to commercialize under these circumstances.

The case in point is the preparation of zirconia ceramic fibers by the aforesaid method of Yokoo and coworkers. In the hydrolysis of the $Zr(O-nC_3H_7)_4-C_2H_5OH-HCl-H_2O$ system, zirconia sols show good spinnability in the limited cases where 0.7 to 1.5 moles of water and 4 moles or more of $C_2H_5OH$ are used for 1 mole of $Zr(O-nC_3H_7)_4$.

It is also generally known in the preparation of ceramics from metal alkoxides by the sol-gel process that some of the alkyl groups may occasionally remain unreacted in the gels and turn into residual carbon in the ceramics after sintering and this would cause the problem of decreasing in the strength and electrical properties of the ceramics.

The present inventors proposed a novel process for the preparation of zirconia sols in Japan Kokai Tokkyo Koho No. 2-293,324 (1990) in order to solve the aforesaid problems. According to this process, a zirconium alkoxide or its solution is hydrolyzed by addition of aqueous hydrogen peroxide containing an acid or by consecutive addition of aqueous hydrogen peroxide and an acid and the resulting zirconia sol is molded into a desired shape, gelled, and sintered to yield zirconia forms.

This process is extremely effective for the removal of residual carbon and accomplishes the initial objective. However, it has other problems such as foaming during the gelation and molding of sols, breakage of gel fibers in an extrusion spinning apparatus.

The present inventors have undertaken extensive studies to clarify the causes of these problems and find their solutions and completed this invention.

OBJECT AND SUMMARY OF THE INVENTION

It is therefore an object of this invention to provide a process for preparing a zirconia sol which can produce a desired form satisfactorily on a commercial scale with residual carbon eliminated as much as possible and without the problem of foaming in the gelation and molding step.

Another object of this invention is to provide a process for preparing a zirconia form which comprises preparing a zirconia sol, gelling and molding said sol without foaming, and sintering the resulting gel to yield a desired form advantageously on a commercial scale.

A further object of this invention is to provide a process for preparing a zirconia sol which allows to control the microstructure of zirconia with ease and yields a sol moldable into a form of desired shape with ease in good condition and a process for preparing a zirconia form from said zirconia sol.

A still further object of this invention is to provide a process for preparing a zirconia sol or a zirconia form therefrom which comprises selecting a specified stabilizing agent, adding said stabilizing agent to the normal zirconia sol at a specified ratio, converting said sol with said stabilizing agent to a gel, drying said gel, and sintering said dried gel under specified conditions to furnish a stabilized zirconia form particularly useful for oxygen ion conductors such as oxygen sensors and solid electrolytes, a partially stabilized zirconia form particularly useful for structural ceramics, and a tetragonal zirconia form potentially useful for oxygen ion conductors and structural ceramics.

This invention accordingly relates to a process for preparing a zirconia sol which comprises hydrolyzing a zirconium alkoxide by aqueous hydrogen peroxide in the presence of an acid, evaporating the hydrolysate to dryness, and redispersing the dried hydrolysate in an organic solvent and also to a process for preparing a zirconia form which comprises molding said zirconia sol into a desired shape, converting said sol into a gel, drying said gel, and sintering said dried gel to furnish a zirconia form.

Zirconium alkoxides useful for the preparation of zirconia sols in this invention include zirconium methoxide, zirconium ethoxide, zirconium isopropoxide, zirconium n-propoxide, zirconium n-butoxide, zirconium t-butoxide and zirconium s-butoxide. Some zirconium alkoxides are liquid at ambient temperature while others are solid. It is desirable to use a solid zirconium alkoxide in the form of a solution in an organic solvent. The organic solvents useful for dissolving solid zirconium alkoxides are alcohols such as ethyl alcohol, isopropyl alcohol, and butyl alcohol, aromatic solvents such as benzene, toluene, and xylene, or mixtures of the two.

According to the process of this invention, a zirconium alkoxide such as mentioned above is hydrolyzed by aqueous hydrogen peroxide in the presence of an acid to yield a hydrolysate as a transparent precursor sol. The aqueous hydrogen peroxide and the acid here may be added to the reaction system either simultaneously as a premix of the two or in succession, first the hydrogen peroxide and then the acid. The amount of hydrogen peroxide to be present in the reaction system is 2 moles or more, preferably 5 to 10 moles, per 1 mole of zirconium alkoxide. With less than 2 moles of hydrogen peroxide, white precipitates form and the hydrolysate is not obtained as a transparent precursor sol.

The acid to be used for the hydrolysis of zirconium alkoxide may be a mineral acid such as nitric acid, hydrochloric acid, and sulfuric acid or an organic acid such as acetic acid or a mixture of these acids, with nitric acid and hydrochloric acid being preferable. The amount of acid is 0.3 mole or more, preferably 0.5 to 1 mole, per 1 mole of zirconium alkoxide. With less than 0.3 mole of acid, white precipitates form and the hydrolysate is not obtained as a transparent precursor sol.

The hydrolysis of a zirconium alkoxide is effected, if necessary, in the additional presence of an organic solvent in the reaction system. The organic solvent useful for this purpose is preferably a solvent of the zirconium alkoxide and includes the above-mentioned alcohols such as ethyl alcohol, isopropyl alcohol, and butyl alcohol and aromatic solvents such as benzene, toluene, and xylene or mixtures of the two. The organic solvent in question is used in such an amount as to maintain the reaction system in solution, normally 0 to 10 moles, preferably 2 moles or so, per 1 mole of zirconium alkoxide.

The hydrolysate obtained in this manner is then evaporated to dryness. The condition to be observed strictly here is that the water evaporates without causing any change in the properties (structure) of the sol. The evaporation is usually carried out at or below 80° C., preferably in the vicinity of 60° C., and at reduced pressure of 20 mmHg or less although the condition may vary with the kind of zirconium alkoxide or the organic solvent in use.

The dried hydrolysate is redispersed in an organic solvent to yield a zirconia sol in this invention. The organic solvent for this purpose is also an alcohol such as ethyl alcohol, isopropyl alcohol, and butyl alcohol, an aromatic solvent such as benzene, toluene, and xylene, or a mixture of the two, preferably an alcohol. Ethyl alcohol is most preferable in overall consideration of safety, dispersibility, and economics. The solid content (as zirconia) of a redispersed zirconia sol may vary with the end use and the molding process, but it is 50 to 80% by weight for fiber use, 5 to 10% by weight for coating use, and 5 to 80% by weight for bulk use.

The zirconia sol of this invention thus prepared is molded into a desired shape in the usual manner, gelled, dried, and sintered at a specified temperature to yield a zirconia form. A zirconia sol becomes highly viscous when sealed in a glass container and allowed to age or concentrated by removal of the solvent and such viscous sol can be sheeted with a doctor blade, applied as coating, spun into fibers, or cast in a mold to yield bulk gel. According to the process of this invention, there is no particular need to carry out these processing operations in a closed space to avoid contact with moisture in the air and this makes the operations extremely simple. The crystalline phase of zirconia in the sintered form is not specified and normally tetragonal or monoclinic or a mixture of the two.

It is possible in this invention to prepare a stabilized zirconia form, a partially stabilized zirconia form, or a tetragonal zirconia form, useful for a variety of applications by selecting a specified stabilizing agent, adding said stabilizing agent at a specified ratio to the reaction mixture before, during, or after the hydrolysis of a zirconium alkoxide to form a stabilized zirconia sol, a partially stabilized zirconia sol, or a tetragonal zirconia sol, converting said sol to a gel, drying said gel, and sintering said gel under the specified conditions with proper control exercised over the sintering temperature and the rate of temperature rise to form a solid solution of zirconia and said stabilizing agent.

The stabilizing agent useful for this purpose may be one or more metal salts suitably chosen from the following: $YCl_3 \cdot 6H_2O$, $Y_2(SO_4)_3 \cdot 8H_2O$, $Y(NO_3)_3 \cdot 6H_2O$, $Y_2(CO_3)_3 \cdot 3H_2O$, $Y(CH_3COO)_3 \cdot 4H_2O$, $Y_2(C_2O_4)_3 \cdot 9H_2O$, $CaCl_2 \cdot H_2O$, $Ca(ClO)_2 \cdot 3H_2O$, $CaSO_4 \cdot 2H_2O$, $Ca(NO_3)_2 \cdot 4H_2O$, $Ca(C_2O_4) \cdot H_2O$, $Ca(CH_3COO)_2 \cdot H_2O$, $MgCl_2 \cdot 6H_2O$, $Mg(ClO_4)_2 \cdot 6H_2O$, $MgSO_4 \cdot H_2O$, $MgSO_4 \cdot 7H_2O$, $Mg(NO_3)_2 \cdot 6H_2O$, $Mg(CH_3COO)_2 \cdot 4H_2O$, $Mg(C_2O_4) \cdot 2H_2O$, $Ce(ClO_4)_3 \cdot 6H_2O$, $Ce(OH)_4 \cdot H_2O$, $Ce(SO_4)_3 \cdot 8H_2O$, and $Ce(NO_3)_3 \cdot 8H_2O$. The amount of such metal salt to be added depends on whether the intended product is a stabilized zirconia form, a partially stabilized zirconia form, or a tetragonal zirconia form. The metal salt is normally added so that its oxide, for example, $Y_2O_3$, CaO, MgO, and $CeO_2$, accounts for 0 to 50 mole % of a solid solution with zirconia after sintering.

In the preparation of a stabilized zirconia form, a stabilizer is chosen and added to a zirconia sol in such an amount as to yield a solid solution containing, for example, 16 mole % or more of MgO or CaO, 8 mole % or more of $Y_2O_3$, or 18 mole % or more of $CeO_2$ after sintering. In the preparation of a partially stabilized zirconia form, a stabilizer is chosen and added to a zirconia sol in such an amount as to yield a solid solution containing, for example, 8 to 10 mole % MgO or CaO after sintering and the mixture is first sintered at 1,700° C. or so and then annealed at 1,200° C. or so. In the preparation of a tetragonal zirconia form, a stabilizer is chosen and added to a zirconia sol in such an amount as to yield a solid solution containing, for example, 2 to 4 mole % of $Y_2O_3$ or 9 to 14 mole % of $CeO_2$ after sintering.

The stabilized zirconia thus prepared retains fluorite type cubic crystals, a crystal form stable at high temperature, at room temperature. The partially stabilized zirconia has cubic crystals in admixture with tetragonal or monoclinic crystals while the tetragonal zirconia has fine grains approximately less than 0.5 μm in size.

There is no specific limitation to the process for molding the zirconia sols of this invention into a desired shape and any known process is applicable. As the viscosity of zirconia sols is adjustable to any desired level, the sols may be submitted to the steps for gelation and molding as prepared, after dilution, or after aging or concentration to a higher viscosity. The zirconia sols can be aged by leaving them at 20° to 80° C. and ambient pressure (1 atmosphere) for 1 to 180 days or they can be concentrated in vacuum at a temperature in the range from room temperature to approximately 100° C., preferably in the vicinity of 60° C., in an evaporator. The resulting viscous sols are converted to thin films by dip-coating or spinning, sheeted by a doctor blade, fiberized by extruding or spinning, or cast into bulks in molds. The "forms" in this invention refer to moldings in a variety of forms such as powders, fibers, bulks, and films and are not limited to moldings obtained by pressing.

There is also no specific limitation to the process of drying the forms, or gel. The process is chosen suitably depending upon the end use of the forms; for example, it may be based on drying at ambient temperature and pressure, drying under reduced pressure, or drying under supercritical conditions with $CO_2$ as extraction solvent.

Moreover, the forms of dried zirconia gels can be sintered at 400° to 1,800° C. by any of known sintering processes.

According to the process of this invention, hydrogen peroxide that is a strong oxidant oxidizes the alkyl groups remaining unchanged, if any, during the preparation of a zirconia sol and prevents the formation of residual carbon in the sintering step. Furthermore, the use of hydrogen peroxide does not present the problem of foaming in the gelation and molding of the zirconia sol as the sol is first evaporated to dryness and then redispersed in an organic solvent.

This invention provides zirconia sols, stabilized zirconia sols, partially stabilized zirconia sols, or tetragonal zirconia sols, all free of white precipitates in high purity and homogeneity. Viscous sols with good spinnability and moldability can be prepared from such zirconia sols and the viscous sols are molded into a desired shape and sintered to furnish zirconia forms in powders, fibers, films, and the like.

DETAILED DESCRIPTION OF THE PREFERRED EMBODIMENTS

This invention will be explained in detail with reference to the accompanying examples but not limited thereto.

EXAMPLE 1

Into a reactor (a 200-ml. round-bottomed flask) was introduced 0.052 mole of zirconium n-butoxide (as a commercial 90% butanol solution), the solution was stirred vigorously with a magnetic stirrer, 31 wt. % aqueous hydrogen peroxide and nitric acid were added at once at the respective mole ratio to the zirconium n-butoxide shown in Table 1, and the hydrolysis reaction was carried out at room temperature. The hydrolysates were observed and the results are noted in Table 1.

The hydrolysates designated as colorless transparent or yellow transparent in Table 1 appeared as white precipitates in the system at the start of the reaction. The reaction soon started to liberate heat and the white precipitates disappeared by the time the liberation of heat subsided. The hydrolysates became colorless transparent or yellow transparent when continuously stirred for one day. In the table, ○ stands for colorless transparent,  for yellow transparent, and × for not transparent with the formation of white particles.

TABLE 1

| $HNO_3/Zr(O-nBu)_4$ (mol ratio) | $H_2O_2/Zr(O-nBu)_4$ (mol ratio) | | | | | |
|---|---|---|---|---|---|---|
| | 0 | 2 | 3 | 4 | 5 | 10 |
| 0 | × | × | × | × | × | × |
| 0.25 | × | × | × | × | × | × |
| 0.5 | × | × | × | × | × | ○ |
| 0.75 | × | × | × | × | ○ | ○ |
| 1.0 | × | × | | | | |

A portion of the hydrolysate obtained at mole ratio $H_2O_2/Zr(O-nBu)_4=5$ and $HNO_3/Zr(O-nBu)_4=0.75$ was dried in a hot-air dryer at 90° C. to give a dried precursor sol, which was investigated by infrared spectrophotometry, differential thermal analysis (DTA), and X-ray diffractometry. No peak ascribable to organic radicals such as alkyl groups was observed in the infrared analysis or no exothermic peak due to the decomposition of organic matters was observed in the DTA. A peak observed near 430° C. in the DTA was confirmed to be due to the crystal transformation of zirconia from amorphous to tetragonal in the light of the results of X-ray diffractometry.

The colorless transparent or yellow transparent hydrolysates thus obtained were evaporated to dryness at 60° C. in an evaporator and the dried hydrolysates were redispersed in 100 ml. of ethanol by stirring to yield transparent zirconia sols in ethanol.

The transparent sols were concentrated in an evaporator at 60° C. until the solid content became approximately 50% by weight to yield viscous sols with a viscosity of 10 to 100 poises. The viscous sols showed an extremely good spinnability and could be spun into continuous gel fibers, several meters in length, by dipping a stirring rod into the sols and pulling it out.

The gel fibers prepared at the mole ratios $H_2O_2/Zr(O-nBu)_4=5$ and $HNO_3/Zr(O-nBu)_4=0.75$ was dried for one day and sintered at 500° C., 750° C., 1,000° C., or 1,500° C. at a heating rate of 1° C./min. The zirconia fibers thus sintered at different temperatures were characterized by X-ray diffractometry (XRD); tetragonal at 500° C. or 750° C., a mixture of tetragonal and monoclinic at 1,000° C., and monoclinic at 1,500° C. The observation of the zirconia fibers by scanning electron microscopy (SEM) indicated that each fiber is circular in cross section, approximately 10 μm in diameter, and smooth on the surface. The grain size of zirconia in the fibers was 0.05 μm or so after sintering at 500° C., 0.1 μm or so after sintering at 750° C. or 1,000° C., and 1 μm or so after sintering at 1,500° C. with attendant grain growth.

The relative density calculated on the basis of the BET specific surface area, pore size distribution, and total pore volume was 89% for the zirconia fibers sintered at 500° C., 97% for those sintered at 750° C., 99.2% for those sintered at 1,000° C., and 98% for those sintered at 1,500° C.

EXAMPLE 2

Zirconium n-butoxide (0.1 mole) from the same lot as used in Example 1 was hydrolyzed as in Example 1 at the mole ratios $H_2O_2/Zr(O-nBu)_4=10$ and $HNO_3/Zr(O-nBu)_4=0.75$, the hydrolysate was evaporated to dryness at 60° C. in an evaporator, and the dried hydrolysate was redispersed in ethanol to yield a zirconia sol.

Yttrium nitrate was added to the zirconia sol in such an amount as to provide $Y_2O_3$(8 mole %)-$ZrO_2$ in the final product to give a stabilized zirconia sol, which was adjusted in viscosity to 0.5 centipoise by ethanol and applied by dip coating to a commercial 2-inch square alumina substrate (99.5% in purity). It was possible to form a zirconia film in a thickness of approximately 0.2 $\mu$m by one dipping operation. The procedure of dip coating and sintering was repeated 10 times to form a zirconia film in a thickness of approximately 1.5 $\mu$m.

The sintering here was conducted at 1,000° C., 1,200° C., or 1,350° C. The films formed were all found to be cubic in crystal structure by XRD and also to be dense and free of cracks and peeling and other defects by SEM.

An electrode was prepared by baking a platinum paste on the aforesaid zirconia film at intervals of approximately 5 mm and an electric conductivity was $6.0 \times 10^{-2} \Omega^{-1} \cdot cm^{-1}$ at 800° C. determined by the ac two point method.

EXAMPLE 3

Zirconium ethoxide (0.1 mole) was dissolved in 5 molar times ethanol, aqueous hydrogen peroxide and nitric acid were added to the solution at the mole ratios $H_2O_2/Zr(OEt)_4 = 10$ and $HNO_3/Zr(OEt)_4 = 0.75$, and a zirconia sol was prepared as in Example 1 by hydrolysis, evaporation to dryness, and redispersion in ethanol.

Yttrium nitrate sufficient to provide $Y_2O_3$(3 mole %)-$ZrO_2$ was added to the zirconia sol to yield a sol of tetragonal zirconia.

The tetragonal zirconia sol thus obtained was cast in a polypropylene container, sealed, and left for one month. The wet bulk gel thereby formed was taken out of the polypropylene container and submitted to supercritical drying ($CO_2$ extraction) to yield an aerogel.

The aerogel was then sintered at 1,000° C. or 1,200° C. for 5 hours to yield bulk zirconia, which showed a specific surface area of 36 $m^2/g$, when sintered at 1,000° C. or 12.6 $m^2/g$, when sintered at 1,200° C. Each of the bulk zirconia was tetragonal and particularly useful for catalyst carriers.

EXAMPLE 4

Aqueous hydrogen peroxide and nitric acid were added in rapid succession to 0.52 mole of zirconium n-butoxide from the same lot as used in Example 1 at the mole ratios $H_2O_2/Zr(O-nBu)_4 = 10$ and $HNO_3/Zr(O-nBu)_4 = 0.75$ and the mixture was hydrolyzed as in Example 1 to yield a transparent hydrolysate.

Yttrium nitrate was added to the hydrolysate so as to give $Y_2O_3$(3 mole %)-$ZrO_2$, mixed uniformly, and evaporated to dryness in an evaporator and the dried hydrolysate was redispersed in ethanol to give a zirconia sol.

The zirconia sol was concentrated to 80% by weight and the resulting highly viscous sol was extruded in a spinning apparatus to yield continuous gel fibers. The diameter of the nozzle of the spinning apparatus was 100 $\mu$m and that of the extruded fibers was 80 $\mu$m.

The fibers were then sintered to give zirconia fibers by heating to 750° C., 1,000° C., 1,250° C., or 1,500° C. at 1° C./min, and holding for 1 hour at respective temperature.

Determination of the crystal structure of the fibers by XRD indicated that those sintered at 750° C. or 1,000° C. were entirely tetragonal, those sintered at 1,250° C. were tetragonal with a trace of monoclinic, and those sintered at 1,500° C. were roughly half tetragonal and half monoclinic.

The fibers sintered at 1,250° C. showed the smallest specific surface area as determined by the BET method. The fibers sintered at the different temperatures all had a smooth surface, a circular cross section, and a diameter of approximately 50 $\mu$m by SEM observation. The grain size of zirconia in those fibers was 0.2 $\mu$m or so when sintered at 750° C. or 1,000° C., 0.1 $\mu$m or so when sintered at 1,250° C., and 0.5 to 1 $\mu$m when sintered at 1,500° C., indicating a grain growth in the last case.

COMPARATIVE EXAMPLE 1

A hydrolysate was prepared as in Example 4, yttrium nitrate was added to the hydrolysate so as to give $Y_2O_3$(3 mole %)-$ZrO_2$, and the mixture was concentrated to a solid content (as zirconia) of 70% by weight in an evaporator to yield a highly viscous sol.

The sol was extruded continuously into gel fibers in a spinning apparatus through a nozzle with a diameter of 100 $\mu$m. The gel fibers broke into lengths of 2 to 3 meters as a result of foaming and could not be produced in the continuous form.

What is claimed is:

1. A process for preparing a zirconia sol which comprises hydrolyzing a zirconium alkoxide with aqueous hydrogen peroxide in the presence of an acid to obtain a hydrolysate, evaporating the hydrolysate to dryness to obtain a dried hydrolysate, and redispersing the dried hydrolysate in an organic solvent.

2. A process for preparing a zirconia sol according to claim 1 wherein a stabilizing agent for zirconia is added to said hydrolysate to prepare a stabilized zirconia sol, a partially stabilized zirconia sol, or a tetragonal zirconia sol.

3. A process for preparing a zirconia sol according to claim 1 wherein a stabilizing agent for zirconia is added during redispersion of said dried hydrolyate in said organic solvent to prepare a stabilized zirconia sol, a partially stabilized zirconia sol, or a tetragonal zirconia sol.

4. A process for preparing a zirconia sol according to claim 1 wherein said organic solvent is an alcohol.

5. A process for preparing a zirconia form which comprises hydrolyzing a zirconium alkoxide with aqueous hydrogen peroxide in the presence of an acid to obtain a hydrolysate, evaporating the hydrolysate to dryness to obtain a dried hydrolysate, redispersing the dried hydrolysate in an organic solvent to form a zirconia sol, molding the zirconia sol into a desired shape, and gelling, drying, and sintering said shape.

6. A process for preparing a zirconia form according to claim 5 wherein a stabilizing agent for zirconia is added to said hydrolysate to prepare a stabilized zirconia sol, a partially stabilized zirconia sol, or a tetragonal zirconia sol.

7. A process for preparing a zirconia form according to claim 5 wherein a stabilizing agent for zirconia is added during redispersion of said dried hydrolysate in said organic solvent to prepare a stabilized zirconia sol, a partially stabilized zirconia sol, or a tetragonal zirconia sol.

8. A process for preparing a zirconia form according to claim 5 wherein said organic solvent is an alcohol.

* * * * *